(12) United States Patent
Zha et al.

(10) Patent No.: US 11,787,011 B1
(45) Date of Patent: Oct. 17, 2023

(54) GRINDING WHEEL FOR ONLINE MEASUREMENT OF GRINDING FORCE

(71) Applicants: Xi'an Jiaotong University, Xi'an (CN); Shanghai United Bearing Co., Ltd., Shanghai (CN)

(72) Inventors: Jun Zha, Xi'an (CN); Shidong Ge, Shanghai (CN); Lai Hu, Xi'an (CN); Wenliang Shen, Shanghai (CN); Shubei Wang, Xi'an (CN); Xiaoying Song, Shanghai (CN)

(73) Assignees: Xi'an Jiaotong University, Xi'an (CN); Shanghai United Bearing Co., Ltd., Shanghai (CN)

( * ) Notice: Subject to any disclaimer, the term of this patent is extended or adjusted under 35 U.S.C. 154(b) by 0 days.

(21) Appl. No.: 18/155,023

(22) Filed: Jan. 16, 2023

(30) Foreign Application Priority Data

Mar. 22, 2022 (CN) .......................... 202210279678.2

(51) Int. Cl.
  *B24B 49/10* (2006.01)
  *B24B 49/16* (2006.01)
  *B24D 5/06* (2006.01)
  *G01L 5/1627* (2020.01)

(52) U.S. Cl.
  CPC .............. *B24B 49/16* (2013.01); *B24B 49/10* (2013.01); *B24D 5/06* (2013.01); *G01L 5/1627* (2020.01)

(58) Field of Classification Search
  CPC ......... B24B 49/00; B24B 49/10; B24B 49/16; B24D 5/02; B24D 5/06; G01L 5/16; G01L 5/1627

USPC ...................................... 451/5, 541, 544, 546
See application file for complete search history.

(56) References Cited

U.S. PATENT DOCUMENTS

| 4,860,499 A | * | 8/1989 | Dinger .................... B24B 49/16 |
|---|---|---|---|
| | | | 451/244 |
| 11,229,987 B2 | * | 1/2022 | Eckel .................... G06K 19/045 |
| 2003/0194946 A1 | * | 10/2003 | Malkin ................ G05B 19/042 |
| | | | 451/8 |

(Continued)

FOREIGN PATENT DOCUMENTS

| CN | 102009387 A | * | 4/2011 |
|---|---|---|---|
| CN | 102009387 A | | 4/2011 |

(Continued)

*Primary Examiner* — Eileen P Morgan
(74) *Attorney, Agent, or Firm* — Rachel K. Pilloff; Sean A. Passino; Pilloff Passino & Cosenza LLP (57) ABSTRACT

Disclosed is a grinding wheel for online measurement of a grinding force, including a grinding wheel part with a grinding wheel base, CBN abrasive sheets and grinding wheel cover plate, and an acquisition part with tangential, axial, radial strain gauges and a signal unit for signal acquisition and transmission. A concave side end face of the grinding wheel base is provided with a signal unit mounting groove, the grinding wheel cover plate is sealed with the concave side end face, and the CBN block abrasive sheets are bonded on an outer circumferential surface of the grinding wheel base; the tangential, axial and radial strain gauges are respectively arranged on the outer circumferential surface along tangential and axial directions and in the signal unit mounting groove along radial direction; signal output ends of the tangential, axial and radial strain gauges are respectively connected with an input end of the signal unit.

7 Claims, 10 Drawing Sheets

(56) References Cited

U.S. PATENT DOCUMENTS

| | | | |
|---|---|---|---|
| 2006/0159533 A1* | 7/2006 | Zeiler | B25D 17/00 |
| | | | 408/226 |
| 2008/0004743 A1* | 1/2008 | Goers | B24B 53/017 |
| | | | 700/121 |
| 2013/0192355 A1* | 8/2013 | Sotgiu | G01M 1/365 |
| | | | 73/146 |
| 2016/0114454 A1* | 4/2016 | Layton, Jr. | B24D 5/10 |
| | | | 451/5 |
| 2020/0039027 A1* | 2/2020 | Goulet | B24B 49/14 |
| 2021/0178554 A1* | 6/2021 | Eckel | B24D 18/0081 |

FOREIGN PATENT DOCUMENTS

| | | | | |
|---|---|---|---|---|
| CN | 202702047 U | | 1/2013 | |
| CN | 109540720 A | * | 3/2019 | G01N 3/56 |
| CN | 110411634 A | | 11/2019 | |
| JP | 3172626 U | | 1/2012 | |

\* cited by examiner

GRINDING WHEEL FOR ONLINE MEASUREMENT OF GRINDING FORCE

CROSS-REFERENCE TO RELATED APPLICATIONS

This application claims priority to Chinese Patent Application No. 202210279678.2, filed on Mar. 22, 2022, the entire contents of which are incorporated herein by reference.

TECHNICAL FIELD

The present application generally relates to precision high-speed grinding, and in particular to a grinding wheel for online measurement of a grinding force.

BACKGROUND

Precision rotary parts such as bearings and gears are indispensable parts in aerospace equipment, military-civil use equipment and high-end equipment, grinding is a necessary processing procedure for the precision rotary parts, and a grinding wheel is necessary processing equipment for grinding the precision rotary parts. In addition, a grinding force applied by the grinding wheel on surfaces of the precision rotary parts directly affects residual stress and retained austenite content on the surfaces of the precision rotary parts, and then affects precision grades and service life of the precision rotary parts. Therefore, effectively controlling the grinding force on the surfaces of the precision rotary parts may improve the precision grades and the service life of the precision rotary parts.

However, in prior arts, collecting the grinding force by power conversion may not meet requirements of controlling the grinding force on the surfaces of the precision rotary parts.

SUMMARY

An objective of the present application is to provide a grinding wheel for online measurement of a grinding force, which is simple as well as ingenious in structure and may directly and accurately measure the grinding force.

To achieve the above objective, the present application adopts a following technical scheme.

A grinding wheel for online measurement of grinding force includes a grinding wheel part and an acquisition part; the grinding wheel part includes a grinding wheel base, cubic boron nitride (CBN) block abrasive sheets and grinding wheel cover plate; a concave side end face of the grinding wheel base is provided with a signal unit mounting groove, the grinding wheel cover plate is tightly sealed and fastened with the concave side end face of the grinding wheel base, and the CBN block abrasive sheets are bonded on an outer circumferential surface of the grinding wheel base; the acquisition part includes tangential strain gauges, axial strain gauges, radial strain gauges and a signal unit for signal acquisition and wireless transmission; the tangential strain gauges and the axial strain gauges are embedded on the outer circumferential surface of the grinding wheel base along tangential direction and axial direction respectively, and the radial strain gauges are arranged in the signal unit mounting groove along radial direction; signal output ends of the tangential strain gauges, signal output ends of the axial strain gauges and signal output ends of the radial strain gauges are respectively connected with an input end of the signal unit.

Optionally, the grinding wheel base is provided with four groups of equally divided grooves; each group of the equally divided grooves includes a tangential mounting groove, an axial mounting groove and a radial mounting groove, where positions of the radial mounting groove, the tangential mounting groove and the axial mounting groove in each group of the equally divided grooves are distributed in Cartesian coordinate system; the tangential mounting grooves are used for flat mounting the tangential strain gauges to collect tangential force in X direction; the axial mounting grooves are used for flat mounting the axial strain gauges to collect axial force in Y direction; and the radial mounting grooves are used for flat mounting the radial strain gauges to collect radial force in Z direction.

Optionally, the tangential mounting grooves and the axial mounting grooves are arranged on the outer circumferential surface of the grinding wheel base, and are respectively provided with first wire holes and second wire holes for mounting signal transmission wires, and radial mounting grooves are arranged in the signal unit mounting groove.

Optionally, the signal transmission wires of the tangential strain gauges pass through the first wire holes, where one end of each signal transmission wire is connected with each tangential strain gauge, and the other end of each signal transmission wire reaches the signal unit mounting groove inside the grinding wheel base to be connected with a signal acquisition module; signal transmission wires of axial strain gauges pass through the second wire holes, where one end of each signal transmission wire is connected with each axial strain gauge, and the other end of each signal transmission wire reaches the signal unit mounting groove inside the grinding wheel base to be connected with the signal acquisition module; and signal transmission wires of radial strain gauges are directly connected with the signal unit.

Optionally, the signal unit includes a signal acquisition module, a signal amplification module and a wireless transmission module connected in sequence and respectively placed in the signal unit mounting groove.

Optionally, the signal unit mounting groove is annularly symmetrically arranged.

Optionally, the CBN block abrasive sheets are bonded with the grinding wheel base to form a circumferential adhesive layer along a circumference, and the adjacent CBN block abrasive sheets are arranged at a gap to form cross-section adhesive layers.

Optionally, the grinding wheel cover plate passes through six cover plate bolt mounting holes through locking bolts, and are correspondingly connected and locked with base screw holes on the grinding wheel base.

The application provides the grinding wheel for the online measurement of the grinding force, four groups of the mounting grooves are arranged on the outer circumferential surface of the grinding wheel base to flat mount the corresponding strain gauges, and a center of the grinding wheel base is hollowed out to embed with the wireless transmission module. In this way, the grinding force is directly contacted and measured in real time to collect the grinding force signals without affecting a rigidity of the grinding wheel. The grinding wheel provided by the present application is simple in structure, more accurate in measurement of the grinding force, higher in reference value of collected data and more practical than a common power conversion method. By collecting direct contact force between the grinding wheel and workpieces in a precision machining process, actual values of the grinding force between the grinding wheel and the workpieces are completely and accurately obtained, and the collected direct contact force is used for data analysis, so that the grinding force is controlled by controlling grinding parameters, and machining accuracy as well as service life of rotary parts are indirectly improved.

BRIEF DESCRIPTION OF THE DRAWINGS

FIG. 1B shows a left cross-sectional view of FIG. 1a.

FIG. 2 is an enlarged view of A in FIG. 1a.

DETAILED DESCRIPTION OF THE EMBODIMENTS

Technical schemes of the present application are clearly and completely described below with reference to drawings and embodiments.

Figure 1A:
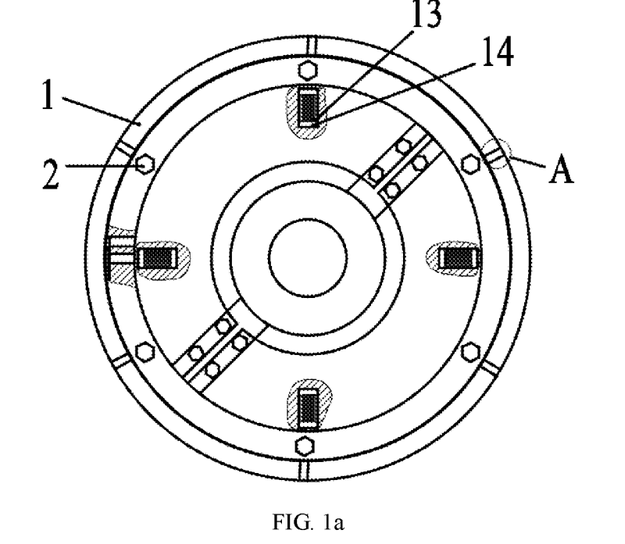
FIG. 1a shows a schematic structural installation diagram of a grinding wheel in an embodiment of the present application.
Figure 1B:
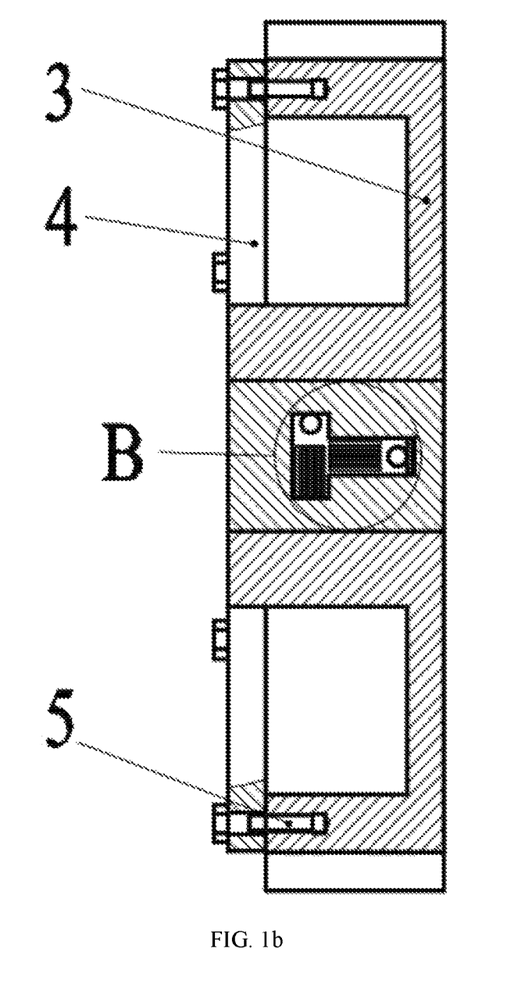
Figure 6:
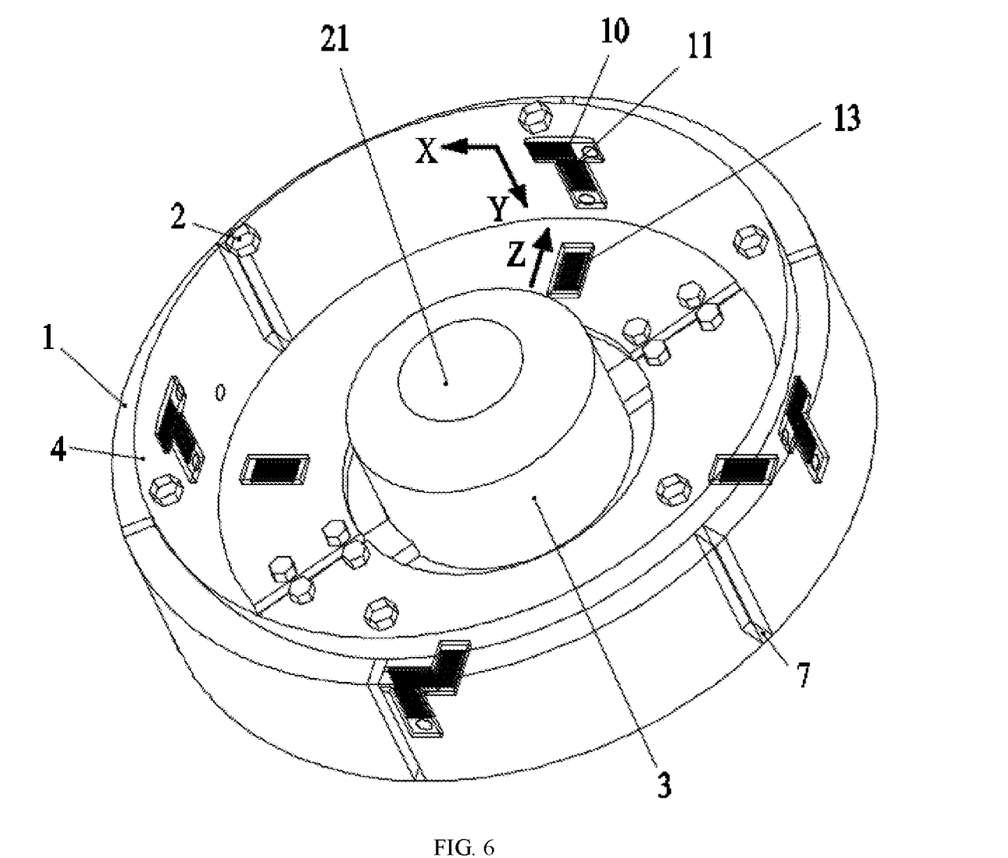
FIG. 6 shows a schematic structural diagram of a grinding wheel in an embodiment of the present application.

As shown in FIG. 1a, FIG. 1B and FIG. 6, the present application provides a grinding wheel for online measurement of a grinding force, including a grinding wheel part and an acquisition part; the grinding wheel part includes a grinding wheel base 3, CBN block abrasive sheets 1 and a grinding wheel cover plate 4; the acquisition part includes tangential strain gauges 10, axial strain gauges 11, radial strain gauges 13 and a signal unit including a signal acquisition module, a signal amplification module and a wireless transmission module.

Figure 4:
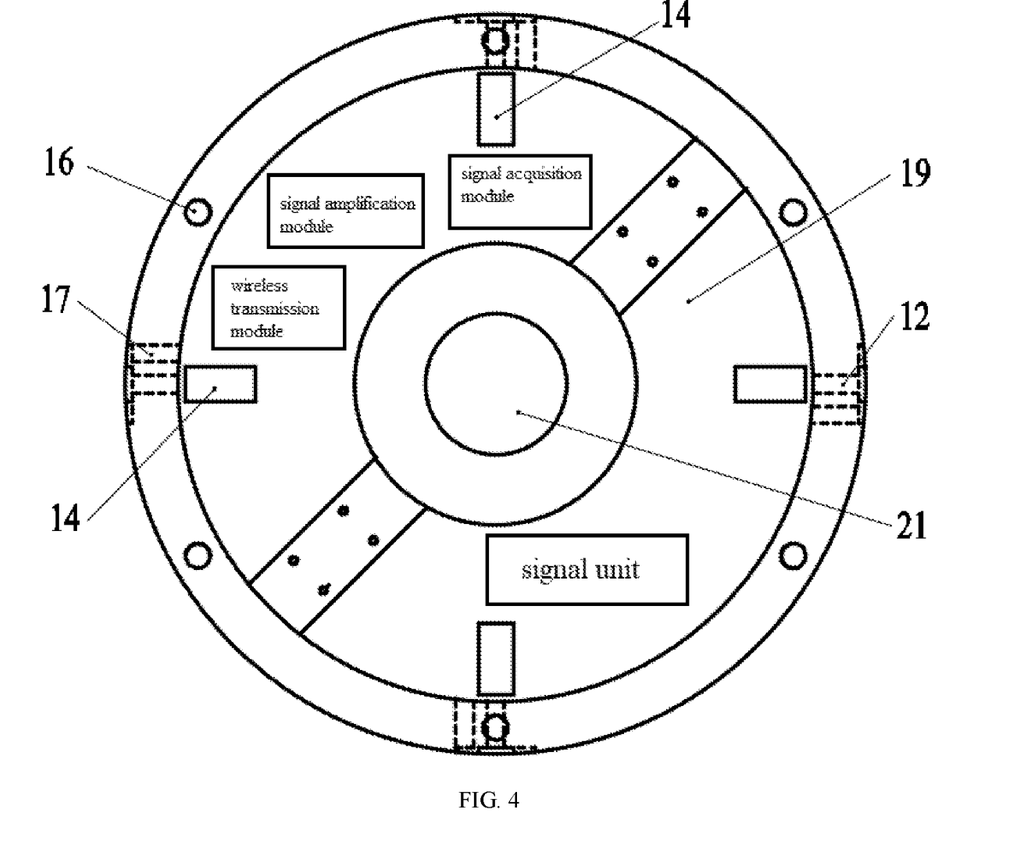
FIG. 4 shows a front view of a grinding wheel base in an embodiment of the present application.
Figure 7:
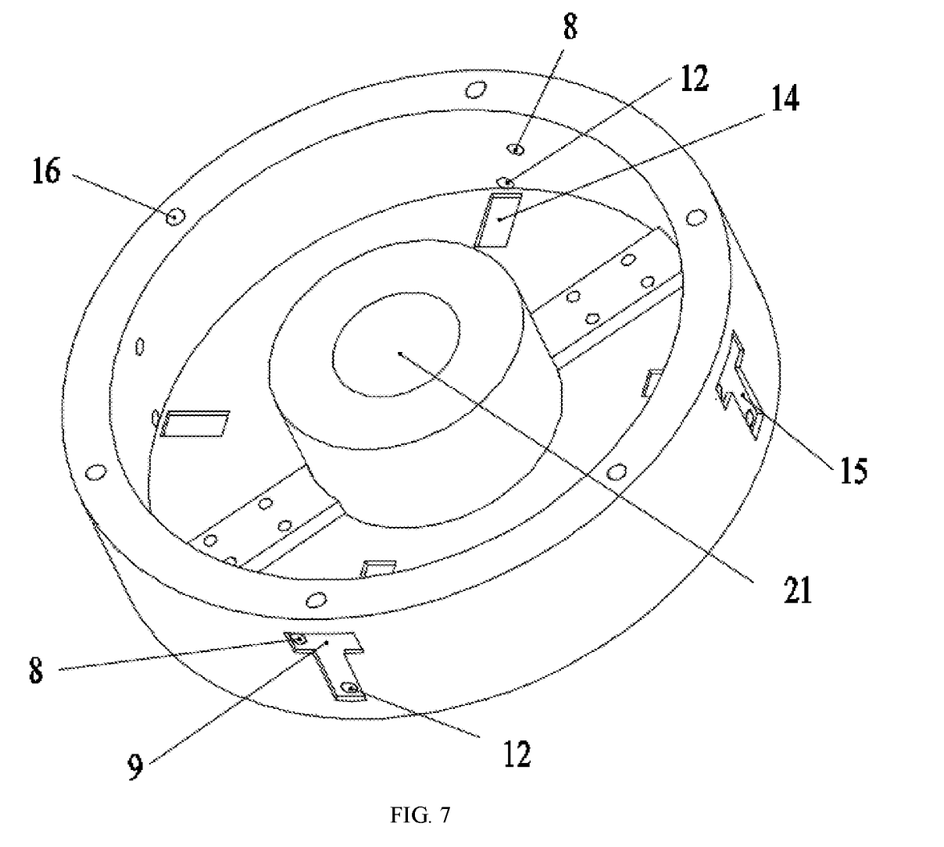
FIG. 7 shows a schematic structural diagram of a grinding wheel base in an embodiment of the present application.

As shown in FIG. 4 and FIG. 7, an overall structure of the grinding wheel base 3 includes the grinding wheel base 3, the CBN block abrasive sheets 1 and the grinding wheel cover plate 4. The grinding wheel base 3 is provided with four groups of equally divided grooves, and each group of the equally divided grooves includes a tangential mounting groove 9, an axial mounting groove 15 and a radial mounting groove 14. In the present application, the overall structure of the grinding wheel base 3 is designed with a minimum size, and the structure size of the grinding wheel base 3 may be changed by different diameters of machined workpieces. Therefore, the grinding wheel base 3 provided by the present application has a wide application range.

Figure 5A:
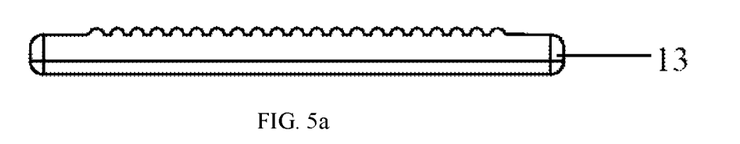
FIG. 5a shows a front view of a strain gauge in an embodiment of the present application.
Figure 5B:
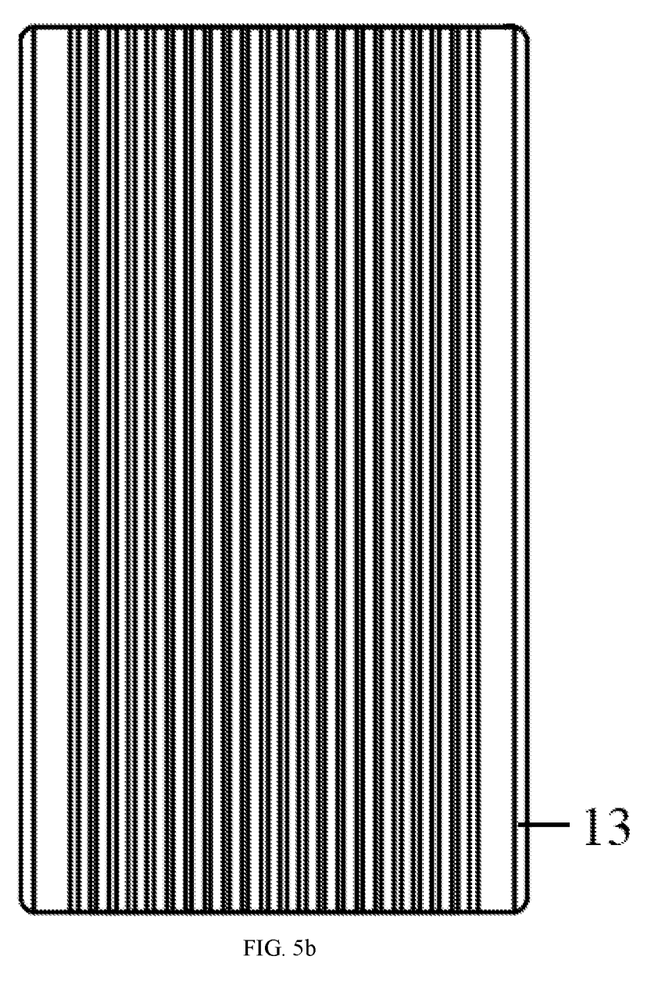
FIG. 5b shows a side view of a strain gauge in an embodiment of the present application.
Figure 8:
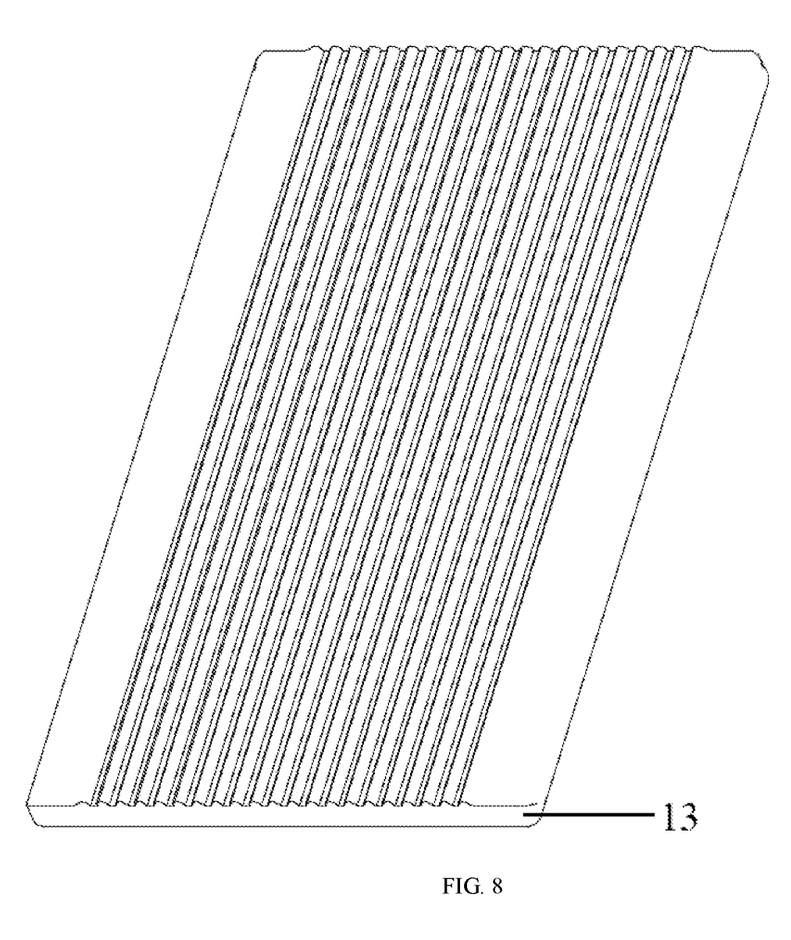
FIG. 8 illustrates a structural isometric view of a strain gauge in an embodiment of the present application.

As shown in FIG. 5a, FIG. 5b and FIG. 8, the tangential mounting grooves 9 are used for flat mounting the tangential strain gauges 10 to collect tangential force in X direction; the axial mounting grooves 15 are used for flat mounting the axial strain gauges 11 to collect axial force in Y direction; and the radial mounting grooves 14 are used for flat mounting the radial strain gauges 13 to collect radial force in Z direction.

The tangential mounting grooves 9 and the axial mounting grooves 15 are arranged on the outer circumferential surface of the grinding wheel base 3, and are respectively provided with first wire holes 8 and second wire holes 12 for mounting signal transmission wires, and the radial mounting grooves 14 are arranged in the signal unit mounting groove 19. Moreover, positions of the radial mounting groove 14, the tangential mounting groove 9 and the axial mounting groove 15 in each group of the equally divided grooves are distributed in Cartesian coordinate system, which is conducive to detecting the grinding force in the X direction, in the Y direction and in the Z direction. When the radial strain gauges 13 test the grinding force in the Z direction, the strain gauges with different measuring ranges may be replaced according to different feeding force in the Z direction and has a strong interchangeability. The tangential strain gauges 10 and the axial strain gauges 11 are embedded on the outer circumferential surface of the grinding wheel base 3, and transmit grinding force signals through the signal transmission wires in wire holes. The above structure ensures that the grinding force signals are not lost when measuring the grinding force, and signal transmission is not interfered. Test points of the grinding force is in direct contact with the CBN abrasive sheets, which is beneficial to accurately acquire the grinding force signals, is superior to a traditional power conversion algorithm, and improves precision and safety for the online measurement of the grinding force.

The grinding wheel base 3 is sealed by the grinding wheel cover plate 4 made of a same material as the grinding wheel base 3, and then is sealed and fastened by six locking bolts 2 distributed on a circumference of an end face. The CBN block abrasive sheets 1 are bonded on the outer circumferential surface of the grinding wheel base 3. Before bonding, the tangential strain gauges 10, the axial strain gauges 11 and the radial strain gauges 13 are bonded into the tangential mounting grooves 9, the axial mounting grooves 15 and the radial mounting grooves 14, respectively; the tangential strain gauges 10 and the axial strain gauges 11 correspond to the four groups of the equally divided grooves, and are equally arranged in four groups on a circumference of the grinding wheel.

Figure 3:
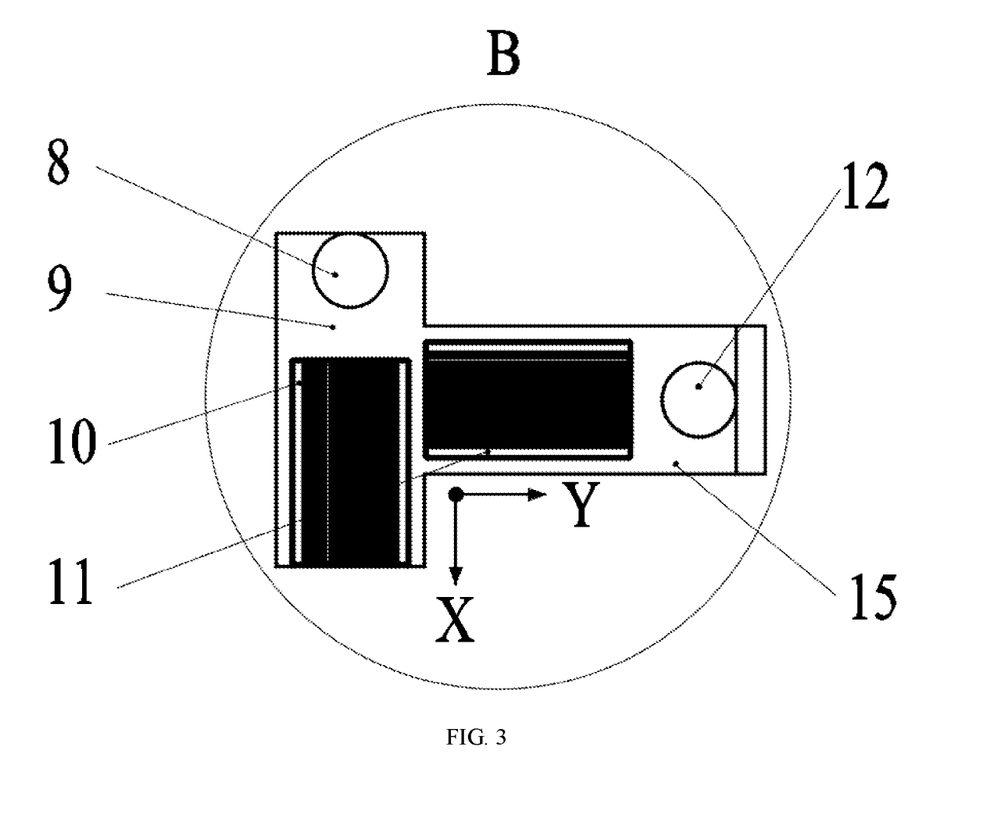
FIG. 3 is an enlarged view of B in FIG. 1B.

As shown in FIG. 1B and FIG. 3, the signal transmission wires of the tangential strain gauges 10 pass through the first wire holes 8, where one end of each signal transmission wire is connected with each tangential strain gauge 10, and the other end of each signal transmission wire reaches the signal unit mounting groove 19 inside the grinding wheel base 3 to be connected with the signal acquisition module; signal transmission wires of axial strain gauges 11 pass through the second wire holes 12, where one end of each signal transmission wire is connected with each axial strain gauge 11, and the other end of each signal transmission wire reaches the signal unit mounting groove 19 inside the grinding wheel base to be connected with the signal acquisition module; and signal transmission wires of radial strain gauges 13 are directly connected with the signal acquisition module.

The signal acquisition module, the signal amplification module and the wireless transmission module are connected in sequence and respectively placed in the signal unit mounting groove 19, where the signal unit mounting groove 19 is arranged in the hollowed-out grinding wheel base 3, and optionally circularly as well as symmetrically.

As shown in FIG. 6, during installation, the processed grinding wheel base 3 is cleaned, a thin layer of fine sand is sprayed on the tangential (X) mounting grooves 9, the axial (Y) mounting grooves 15 and the radial (Z) mounting grooves 14 arranged on the grinding wheel base 3 for bonding the strain gauges. The tangential (X) strain gauges 10, the axial (Y) strain gauges 11 and the radial (Z) strain gauges 13 are bonded to the corresponding tangential (X) mounting grooves 9, the axial (Y) mounting grooves 15 and the radial (Z) mounting grooves 14, respectively, and cooled for 3 minutes (min). The signal transmission wires of the tangential strain gauges 10 and the axial strain gauges 11 respectively pass through the first wire holes 8 and the second wire holes 12 into the signal unit mounting groove 19 inside the grinding wheel base 3.

Figure 2:
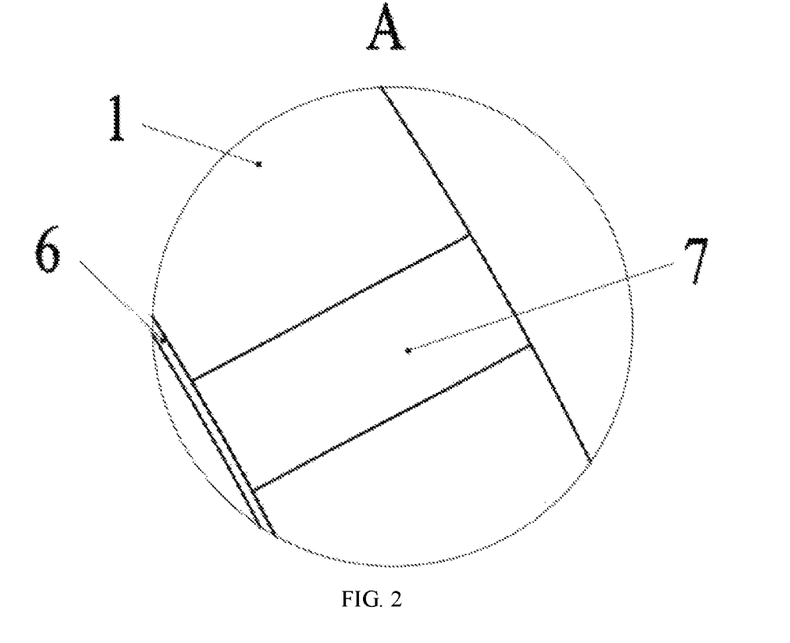

Further, as shown in FIG. 1a and FIG. 2, the processed CBN block abrasive sheets 1 are bonded step by step on the circumference of the grinding wheel by adhesive to form a circumferential adhesive layer 6 between the grinding wheel base 3 and the CBN block abrasive sheets 1. The adjacent CBN block abrasive sheets 1 are arranged at a gap to form cross-section adhesive layers 7 between the grinding wheel base 3 and the CBN block abrasive sheets 1, and are heated at 50 degree Celsius (° C.) for 3 hours (h).

Further, the signal acquisition module, the signal amplification module and the wireless transmission module are placed in the signal unit mounting groove 19 inside the grinding wheel base 3, and the signal acquisition module is connected with the signal transmission wires of the tangential strain gauges 10, the axial strain gauges 11 and the radial strain gauges 13, respectively.

Further, the grinding wheel cover plate 4 passes through six cover plate bolt mounting holes 16 through locking bolts 2, and are correspondingly connected and locked with base screw holes 5 on the grinding wheel base 3.

Further, the grinding wheel part is installed with a grinding wheel handle through a mounting hole for the grinding wheel handle 21, and collects the grinding force signals.

The application provides the grinding wheel for the online measurement of the grinding force, including the grinding wheel part forming the overall structure of the grinding wheel and the acquisition part for acquiring and transmitting the grinding force; the grinding wheel base is simple in structure, the strain gauges are easy to install, may accurately collect the grinding force and have the strong interchangeability as well as wide applicability. According to the present application, the structure of the conventional grinding wheel base is changed, and the outer circumferential surface of the grinding wheel base 3 is machined with the tangential mounting grooves 9 and the axial mounting grooves 15 as well as is embedded with the tangential strain gauges 10 and axial strain gauges 11. The CBN block abrasive sheets 1 and outer edge of the grinding wheel base 3 are glued by the adhesive, and in this way, the tangential strain gauges 10 and the axial strain gauges 11 are embedded on the outer circumferential surface of the grinding wheel base 3 forever. Further, inside of the grinding wheel base 3 is hollowed out in a certain range to form the signal unit mounting groove 19, and an internal circumferential surface of the grinding wheel base 3 is machined with the radial mounting grooves 14 as well as is embedded with the radial strain gauges 13. Similarly, the signal transmission wires of the tangential strain gauges 10 and the axial strain gauges 11 pass through the first wire holes 8 and the second wire holes 12 respectively into the signal unit mounting groove 19 inside the grinding wheel base 3 to be connected with the signal acquisition module, and transmit the grinding force signals through the signal amplification module and the wireless transmission module. The grinding wheel cover plate 4 is connected and locked with the base screw holes 5 on the grinding wheel base 3 by the locking bolts 2. By connecting the grinding wheel handle and the mounting hole for the grinding wheel handle 21, power is transmitted, the direct grinding force in the X direction, in the Y direction and in the Z direction is collected, and the grinding force signals are wirelessly transmitted to an external receiving end to complete acquisition. The grinding wheel provided by the present application not only may directly collect the grinding force, but also has a simple structure, high data reliability, wide collection range as well as the strong interchangeability, and is easy to change the structure to collect the grinding force more widely.

It should be understood that the technical schemes of the present application are not limited to the limits of the above specific embodiments, and any technical variations made according to the technical schemes of the present application, without departing from the scope protected by the objective and claims of the present application, fall within the scope of protection of the present application.

What is claimed is:

1. A grinding wheel for online measurement of a grinding force, comprising a grinding wheel part and an acquisition part;
   wherein the grinding wheel part comprises a grinding wheel base, cubic boron nitride (CBN) block abrasive sheets and a grinding wheel cover plate; a concave side end face of the grinding wheel base is provided with a signal unit mounting groove, the grinding wheel cover plate is tightly sealed and fastened with the concave side end face of the grinding wheel base, and the CBN block abrasive sheets are bonded on an outer circumferential surface of the grinding wheel base; and
   the acquisition part comprises tangential strain gauges, axial strain gauges, radial strain gauges and a signal unit for signal acquisition and wireless transmission; the tangential strain gauges and the axial strain gauges are embedded on the outer circumferential surface of the grinding wheel base along a tangential direction and an axial direction respectively, and the radial strain gauges are arranged in the signal unit mounting groove along a radial direction; the tangential strain gauges, the axial strain gauges and the radial strain gauges are respectively in signal connection with the signal unit.

2. The grinding wheel for the online measurement of the grinding force according to claim 1, wherein the grinding wheel base is provided with four groups of equally divided grooves; each group of the equally divided grooves comprises a tangential mounting groove, an axial mounting groove and a radial mounting groove, positions of the radial mounting groove, the tangential mounting groove and the axial mounting groove in each group of the equally divided grooves are distributed in a Cartesian coordinate system; and
   the tangential mounting grooves are used for flat mounting the tangential strain gauges to collect tangential force in a X direction; the axial mounting grooves are used for flat mounting the axial strain gauges to collect axial force in a Y direction; and the radial mounting grooves are used for flat mounting the radial strain gauges to collect radial force in a Z direction.

3. The grinding wheel for the online measurement of the grinding force according to claim 2, wherein the tangential mounting grooves and the axial mounting grooves are arranged on the outer circumferential surface of the grinding wheel base, and are respectively provided with first wire holes and second wire holes, each of the first wire holes is used for mounting a tangential strain gauge signal wire and each of the second wire holes is used for mounting an axial strain gauge signal wire, and radial mounting grooves are arranged in the signal unit mounting groove.

4. The grinding wheel for the online measurement of the grinding force according to claim 3, wherein the tangential strain gauge signal wire passes through each of the first wire holes, wherein one end of the tangential strain gauge signal wire is connected with each of the tangential strain gauges, and an other end of the tangential strain gauge signal wire reaches the signal unit mounting groove inside the grinding wheel base to be connected with a signal acquisition module; the axial strain gauge signal wire passes through each of the second wire holes, wherein one end of the axial strain gauge signal wire is connected with each of the axial strain gauges, and an other end of the axial strain gauge signal wire reaches the signal unit mounting groove inside the grinding wheel base to be connected with the signal acquisition module; and a radial strain gauge signal wire is directly connected with the signal unit.

5. The grinding wheel for the online measurement of the grinding force according to claim 1, wherein the signal unit comprises a signal acquisition module, a signal amplification module and a wireless transmission module connected in sequence and respectively placed in the signal unit mounting groove.

6. The grinding wheel for the online measurement of the grinding force according to claim 1, wherein a circumferential adhesive layer along a circumference is formed at a bonding position between the CBN block abrasive sheets and the grinding wheel base, and there is a gap between adjacent CBN block abrasive sheets, and a cross-section adhesive layer is formed at the gap.

7. The grinding wheel for the online measurement of the grinding force according to claim 1, wherein the grinding wheel cover plate passes through six cover plate bolt mounting holes through locking bolts, and are correspondingly connected and locked with base screw holes on the grinding wheel base.

\* \* \* \* \*